United States Patent Office 3,292,090
Patented Dec. 13, 1966

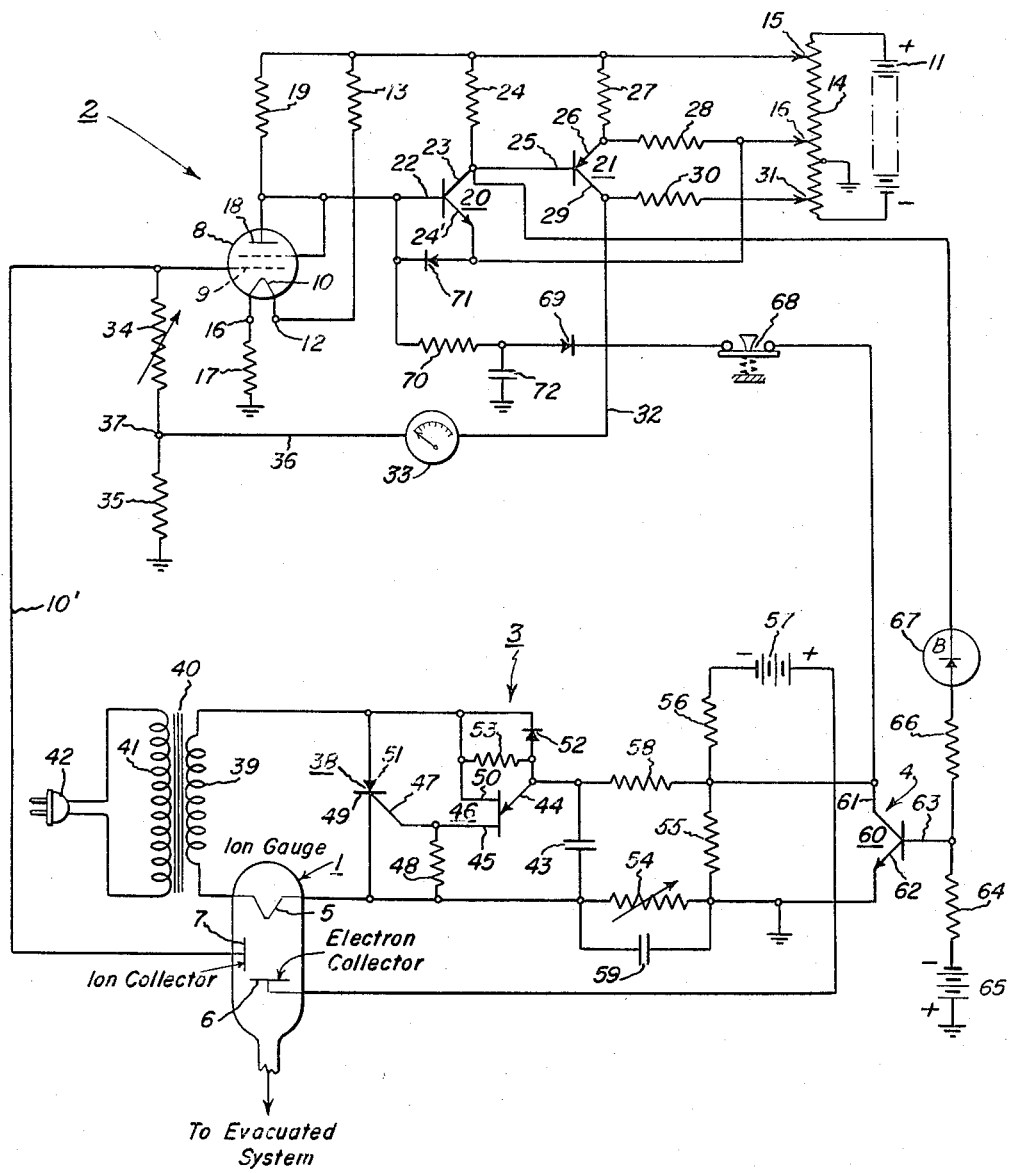
Dec. 13, 1966  R. L. WATTERS  3,292,090
ION GAUGE SYSTEM HAVING OVERLOAD PROTECTION
Filed July 1, 1964
Inventor
Robert L. Watters,
by John F. Ahern
His Attorney.

3,292,090
ION GAUGE SYSTEM HAVING OVERLOAD
PROTECTION
Robert L. Watters, Schenectady, N.Y., assignor to General Electric Company, a corporation of New York
Filed July 1, 1964, Ser. No. 379,633
6 Claims. (Cl. 328—8)

The present invention relates generally to protective means for systems that use negative feedback amplifiers to increase the strength of weak signals to be sensed, or the like, and more particularly relates to means for de-energizing such a system when the magnitude of the sensed signal exceeds a predetermined threshold value.

Many measuring and indicating systems include elements that are advantageously de-energized when the sensed signal exceeds a predetermined magnitude. For example, a desirable feature in most ion gauge systems is a protective circuit that de-energizes the ionizing means, as a hot filament, when the pressure within a vacuum system exceeds a predetermined value. In general the increase in pressure is caused by a leak that draws the surrounding atmosphere, usually containing oxygen, into the system. If a thermionic electron emissive cathode, as a filament, is not immediately de-energized under such conditions the cathode is either destroyed or its subsequent useful lifetime substantially reduced.

Ion gauge systems and the like have heretofore been protected by electromagnetic relays that are actuated in response to the presence of ion current or other sensed signal above a predetermined threshold to de-energize the ion gauge cathode power supply or other energization means. Ordinarily, the relays are of the latching type. Because relays are relatively slow operating devices their use where substantially instantaneous response is required frequently results in ineffective protection. In addition, relays are subject to a plurality of other well-known infirmities including contact welding and sensitivity to mechanical vibrations, for example.

It would be highly desirable to provide protective means, for measuring systems that normally use negative feedback amplifiers, as ion gauge systems, that is responsive to the presence of excess signal to be sensed to deenergize the system, or a selected portion thereof, without depending upon electromagnetic relays or the like. Preferably, the protective means utilizes components already present within the system wherever possible, in order to reduce cost. It is desired that response be substantially instantaneous to provide adequate protection, and a positive response without hesitation is required to avoid ambiguity.

Accordingly, it is an object of my invention to provide improved protective means for a signal sensing system utilizing a negative feedback amplifier and which protective means does not depend upon electromagnetic relays or the like.

It is another object of my invention to provide an ion gauge system having protective means compatible with the remainder of the system and utilizing major elements thereof in a dual role.

Still another object of my invention is to provide an ion gauge system having electronic circuit protection for the ionizing means.

Briefly, in accord with one embodiment of my invention I provide an ion gauge system including a negative feedback electrometer amplifier. The amplifier has a plurality of cascaded direct current amplifying stages, with a subsequent stage which saturates, or ceases to amplify, while preceding stages continue to provide amplification. In this way, when ion current applied to the electrometer amplifier input exceeds a predetermined magnitude, the negative feedback ratio is reduced and the preceding stages substantially instantaneously switch to either their maximum or minimum conduction states. An output signal generated by switching of one or more preceding stages in turn controls electronic switching means, as a transistor, that disables the power supply for the filament, cathode, or other ionizing means of the system. During normal operation the electrometer amplifier serves to amplify the ion current and provide an indication of pressure, for example, within the associated evacuated enclosure. By using such an amplifier in a dual role, circuit complexity and expense are minimized and, because only electronic components are utilized, the system response is readily made essentially instantaneous.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

The schematic diagram illustrates an ion gauge system in accord with my invention.

Principal components of the ionization gauge system of this invention includes an ion gauge device 1, an electrometer amplifier 2, a power supply 3 for energizing the ionization means of device 1, and switching means 49 for disabling power supply 3 whenever continued energization is not desired as, for example, when it would be damaging to the ionization means of device 1. Systems of the type illustrated indicate the pressure of an atmosphere within an evacuated enclosure to which device 1 is attached.

Ion gauge device 1 includes ionization means 5 that can be a directly heated filament, as illustrated schematically, or any of a plurality of other ionization means including cathodes that are indirectly heated. Thermionic electron emission is provided by ionizing means 5 and the electrons emitted collide with gas molecules to provide ionization thereof. The electrons are accelerated and substantially all collected at an electron collector, or anode, 6 and the ions are collected at an ion collector electrode 7. The magnitude of electron current is advantageously used to control a regulated power supply to provide substantially constant electron emission from ionizing means 5. The magnitude of ion current is used as in indication of the pressure within ion gauge device 1.

Electrometer amplifier 2 is of the negative feedback type and includes a plurality of directly coupled cascaded direct current amplifying stages to provide amplification of a direct current input signal. As compelled by the present state-of-the-art, the initial stage of amplifier 2 preferably uses an electrometer input stage amplifying device 8 having an extremely high input impedance and specially designed for amplifying extremely weak input signals of low magnitude.

The electrometer amplifier illustrated in the drawing includes an electron discharge device amplifier 8 having the input electrode, or grid, 9 connected to ion collector electrode 7, as by conductor 10′. Cathode 10 of amplifying device 8 is illustrated schematically as being of the directly heated filament type and is connected in parallel circuit relationship with a source of constant voltage, illustrated schematically as battery 11. Terminal 12 of cathode 10 is connected by resistance 13 to a voltage divider network 14 connected in parallel with battery 11. Resistance 13 is connected to a positive tap 15 of network 14. The remaining terminal 16 of cathode 10 is connected by resistance 17 to ground, or the point of zero reference potential for the system. In this way, cathode 10 is supplied with heating current and biased slightly positive with respect to ground, as is customary with electron discharge amplifying devices. Anode, or electron collector, 18 is connected to tap 15 by anode load resistance 19.

The two subsequent stages of direct current amplifier 2 utilize transistors 20 and 21, respectively. Base 22 of transistor 20 is directly connected to anode 18 and collector 23 of transistor 20 is connected to tap 15 by a resistance 24 that can be shunted by a stabilizing capacitance, if desired. Emitter 24' of transistor 20 is connected to tap 16 on resistance voltage divider 14. Tap 16 is at a lesser positive potential than is tap 15, with reference to ground. The base 25 of PNP transistor 21 is connected to collector 23 of NPN transistor 20. Emitter 26 of transistor 21 is connected by resistance 27 to tap 15 and by resistance 28 to tap 16. Alternatively, emitter 26 can be connected to a single tap intermediate taps 15 and 16 of network 14. Collector 29 of transistor 21 is connected by a resistance 30 to tap 31 of voltage divider network 14. Tap 31 is at a negative potential with respect to ground.

The output of amplifier 2 is taken from collector 29 and returned by conductor 32, preferably through a meter or current indicator 33, to the grid 9 of amplifying device 8 through a resistance divider network comprising resistance 34 connected in series with a resistance 35 from grid 9 to ground. One terminal of meter 33 is connected as by a conductor 36 to the junction 37 of resistances 34 and 35.

At least one of resistances 34 and 35 is advantageously selected to be variable in order to adjust the response of amplifier 2 to a given magnitude of input signal from ion collector electrode 7. In the drawing, resistance 34 has been selected to be variable for this purpose.

The current from ion collector electrode 7 to grid 9 is of positive polarity and increases in the magnitude thereof cause increased conduction of input amplifying device 8. This, in turn, results in decreased conductivity of both of the subsequent amplifying stages illustrated. The potential of collector 29 with respect to ground increases in the negative direction in response to increased magnitude of ion current and vice versa. Thus, the aforementioned feedback path serves to return substantially all of the output of amplifier 2 to the input thereof in inverted polarity to effect a strong negative feedback signal. This negative feedback signal cancels, or counterbalances, the input signal received at grid 9.

Amplifier 2 is selected to provide a high current gain, preferably in excess of 100, so that the ratio of current through meter 33 to the ion current applied to grid 9 is substantially independent of the gain of amplifier 2 and depends upon the resistance value of resistances 34 and 35. By selecting resistance 34 to be many orders of magnitude greater in resistance value than resistance 35, the current through meter 33 is made many orders of magnitude greater than the ion current applied to grid 9 and equal to the magnitude of ion current multiplied by the resistance ratio between resistance 34 and resistance 35.

Frequently, a plurality of input current ranges are provided by having a plurality of resistances of differing resistance values and a suitable high impedance switch having good insulation to selectively insert a resistance of a particular desired value corresponding to a desired range. In this way, the ratio between the ion current input to grid 9 and the current through meter 33 may be varied to provide a large number of ranges with a single amplifier 2 and meter 33.

Power supply 3 provides the necessary energization of the ionization means 5 within ion gauge device 1. In the case illustrated, the ionization means is a filament, or cathode, 5 and heating current is applied thereto by a controllable electronic device 38. The source of power 39 is connected in series loop circuit relationship with device 38 and filament 5. Source 39 is advantageously selected as the secondary of a transformer 40 having the primary winding 41 thereof connected to a suitable source of alternating current voltage, as by conventional male plug 42. The charging rate of a capacitance 43 connected between emitter 44 and base-one 45 of a voltage breakdown device, as unijunction transistor 46, controls the firing of controllable device 38. The control electrode 47 of device 38 is connected to base-one 45 and both electrode 47 and base-one 45 are connected by a resistance 48 to the cathode 49 of device 38. Base-two 50 of the unijunction transistor is connected to anode 51 of device 38 and emitter 44 is connected to anode 51 by a parallel connection of an asymmetrically conducting device, or diode, 52 and resistance 53.

The control current from anode, or electron collector, 6 controls the charging rate of capacitance 43. To this end, a series conection of an adjustable resistance 54, resistance 55, resistance 56 and bias source 57 are connected from cathode 49 of device 38 to anode 6. Resistance 58 is connected from the junction of resistances 55 and 56 to emitter 44 and a stabilizing capacitance 59 shunts resistance 54. The junction between resistances 55 and 54 is grounded, or forms the point of zero reference potential for the regulated power supply circuit.

The operation and circuit details of regulated power supply 3 are treated in more detail and claimed in my copending application Serial No. 320,629, filed November 1, 1963, and assigned to the assignee of the present invention. Briefly, variable resistance 54 is adjusted to provide a desired level of emission current. Thereafter, as the emission current becomes greater than the desired value, the charging rate of capacitance 43 is reduced and controllable device 38 fires later in the one-half power cycle during which it may become conductive, resulting in less power supplied to filament 5 and less emission current therefrom. Conversely, decrease in emission current from the set value causes capacitance 43 to charge more rapidly and power is supplied to filament 5 over a greater portion of the power cycle causing substantial restoration of the desired emission current level. Asymmetrically conducting device 52 is connected to be conductive during the alternate power cycles when power is not supplied to filament 5 and serves to compensate the regulator for line voltage variations as pointed out with greater particularity in my aforementioned copending patent application.

In accord with the present invention, one of the succeeding stages, and preferably the final stage, of direct current electrometer amplifier 2 is made to saturate prior to preceding stages when the input signal exceeds a predetermined threshold magnitude. By saturating, it is meant that further increases in the input signal do not provide any further substantial change in the magnitude of output signal from the particular stage. Thus, a saturated stage in accord with the invention is in either its maximum or minimum conducting state, although the latter is preferred, particularly with semiconductor devices, to achieve maximum reliability and avoid overheating.

When any stage of a direct coupled cascaded amplifier, of the type shown in the drawing, saturates, the total amplifier ceases to provide amplification for further increases in the magnitude of the input signal because the net amplification factor is equal to the product of the gain of the individual stages, and the gain of one stage is equal to zero. When the amplifier is of the negative feedback electrometer type, as illustrated in the drawing, this causes the stabilizing effect of the negative feedback signal to be lost for excursions above the predetermined threshold. Thus, stages preceding the saturating stage essentially switch to their respective maximum or minimum conduction conditions. For example, should the output stage of amplifier 2 saturate, i.e., should transistor 21 provide no further amplification, amplifying device 8 switches to the "on," or essentially maximum conducting state, and transistor 20 becomes substantially non-conductive. This transition will be recognized by those skilled in the art as a shift from "closed loop" to "open loop" operation of a negative feedback system.

In the system shown in the drawing, I provide electronic switching means, that can take the form of an NPN transistor 60 as illustrated, having its collector 61 connected to the junction between resistances 56 and 55 and having its emitter 62 connected to ground, or the point of zero reference potential. Base 63 of transistor 60 is connected by a resistance 64 to a source 65 of negative potential that under ordinary operating conditions prevents substantial conduction of transistor 60. Thus, during normal operation, transistor 60 has negligible effect upon operation of the system as previously described.

However, base 63 is also connected to collector 23 of transistor 20 by a resistance 66 and constant voltage element 67, that can be a Zener diode as shown, connected in series. Element 67 imparts increased sensitivity to the switching circuit by permitting a lower resistance value for resistance 66. When transistor 20 switches to the non-conductive condition in response to saturation of transistor 21, the reduced potential drop across resistance 24 overcomes the negative bias of base 63 and transistor 60 becomes highly conductive. When transistor 60 becomes highly conductive it essentially short-circuits resistance 55 so that no substantial charging of capacitance 43 occurs and there is no longer any firing of device 38 to supply power to filament 5. In this way, the filament power supply is disabled when transistor 21 saturates.

In order to ensure that continued protection of filament 5 will exist until an operator resets the circuit, a holding or latching feature is advantageously utilized. To this end, collector 61 of transistor 60 is connected through a normally closed reset switch 68, a diode 69 and resistance 70 (all connected in series) to base 22 of transistor 20. When transistor 60 becomes conductive, diode 69 conducts, and a substantial magnitude of current is directed away from base 22 of transistor 20, resulting in sustained non-conduction of this device. A transistor-protecting diode 71 is advantageously connected from emitter 24' to base 22 and a filter capacitance 72 is conveniently connected from the junction of resistance 70 and diode 69 to ground.

In general, saturation of any amplifying stage is conveniently adjusted by reducing the effective power supply voltage, for example, by increasing the magnitude of collector resistance (or anode resistance in the case of a vacuum tube) until amplification is no longer provided above a predetermined threshold value of input signal magnitude. In the system of the drawing, saturation is provided for the output stage by selecting resistance 30, that can be variable for this purpose, to exhibit a resistance magnitude sufficient to cause a voltage drop across resistance 30 approximately equal to the absolute magnitude of voltage at tap 31 whenever the input signal to the electrometer amplifier exceeds the predetermined threshold value. Thus, a further increase in input signal magnitude merely serves to further drive the transistor 21 into further cutoff where amplification by this stage essentially ceases because no further change in the voltage drop across resistor 30 can occur.

When the condition which gave rise to the undesirably high magnitude of ion current has been corrected, the system of the drawing can be reset by momentarily depressing switch 68 to open the collector latching circuit. Then, if the ion current is below the selected threshold value, normal operation will be restored. However, in the event that excessive ion current is still present, depressing the reset button will not restore operation of the power supply 3, but will cause only intermittent operation. The latter is, of course, a significant and important feature.

One particularly desirable ion gauge system in accord with my invention utilized the following specific components in the system constructed as shown in the drawing.

| | | |
|---|---|---|
| R-13 | | 1500Ω |
| R-17 | | 300Ω |
| R-19 | | 100KΩ |
| R-24 | | 10KΩ |
| R-27 | | 1500Ω |
| R-28 | | 510Ω |
| R-30 | | 6800Ω |
| R-34 | ohms | $10^6$–$10^{12}$ |
| R-35 | | 1000Ω |
| R-48 | | 100Ω |
| R-53 | | 220KΩ |
| R-54 | | 3900Ω |
| R-55 | | 33KΩ |
| R-56 | | 62KΩ |
| R-58 | | 100KΩ |
| R-64 | | 100KΩ |
| R-66 | | 75KΩ |
| R-70 | | 27KΩ |
| C-43 | μfd | 0.033 |
| C-59 | μfd | 1.0 |
| C-72 | μfd | 0.01 |
| V-15 | volts D.C. | +20 |
| V-16 | do | +10 |
| V-31 | do | −10 |
| V-57 | do | 100 |
| V-65 | do | 10 |
| V-39 | volts R.M.S. A.C. | 13 |
| D-52 | | 1N1692 |
| D-67 | | 1N1523 |
| D-69 | | 1N1692 |
| D-71 | | 1N1692 |
| M-33 | milliamps | 0–1.0 |
| T-1 | | 5966 |
| T-8 | | 5886 |
| T-20 | | 4D26 |
| T-21 | | 2N1175 |
| T-38 | | C15U |
| T-46 | | 2N1671A |
| T-60 | | 4D21 |

The above-described specific ion gauge system provided interruption of power supply 3 consistently within one cycle whenever the ion current exceeded approximately 1.5 times the full scale reading of meter 33. The power supply was disabled within one power cycle, providing a speed of response sufficient to provide protection of filament 5 under all conditions.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. An electric signal sensing system comprising:
    (a) a negative feedback direct current amplifier including a plurality of cascaded amplifying stages, a subsequent one of said stages being saturable at a predetermined value of amplifier input signal magnitude that is insufficient to saturate stages preceding said one stage;
    (b) a source of signal to be sensed coupled to the input of said amplifier; and
    (c) electronic protective means coupled to at least one of said preceding stages and responsive to a sudden change in output signal thereof produced when said subsequent stage saturates to de-energize at least a portion of said system.

2. The system of claim 1 wherein the output of said protective means is coupled to said subsequent stage to additionally provide sustained saturation of said subsequent stage in response to said sudden change.

3. A signal sensing system comprising:
    (a) a negative feedback amplifier including a plurality of amplifying stages a subsequent one of said stages being saturable at a predetermined value of amplifier input signal magnitude that is less than the amplifier input signal magnitude at which preceding stages saturate;
(b) a source of signal to be sensed connected to the input of said amplifier and supplying thereto an input signal to be amplified, said source including an electrically energizable element that can be readily damaged by sustained energization thereof when the signal to be sensed exceeds said predetermined value of amplifier input signal magnitude;
(c) electrical energizing means connected to said energizable element; and
(d) electronic switching means coupled to at least one preceding stage of said amplifier and to said energizing means, said switching means being operative to disable said energizing means in response to an electrical trigger signal generated by said preceding stage upon saturation of said subsequent stage.

4. The system of claim 3 wherein said switching means is additionally coupled to said subsequent stage to provide sustained saturation of said subsequent stage in response to said trigger signal.

5. An ion gauge system comprising:
(a) an ion gauge device including a thermionic electron emissive cathode, an ion collector electrode and an anode;
(b) a power supply connected to said cathode and responsive to the rate at which electrons are collected at said anode to provide a substantially constant rate of electron emission by said cathode during normal operation of said ion gauge device;
(c) a negative feedback electrometer amplifier having a plurality of cascaded amplifying stages, the input of said amplifier being connected to said ion collector electrode and the output of said amplifier being connected to said input to provide negative feedback of substantially all of the output energy of said amplifier;
(d) one stage of said amplifier other than the initial stage being adapted to saturate when the ion current input signal exceeds a predetermined threshold value; and
(e) electronic switching means connected to a stage preceding said one stage of said amplifier and to said power supply, said switching means being responsive to saturation of said one stage to disable said power supply.

6. The system of claim 5 wherein said switching means is additionally responsive to saturation of said one stage to sustain saturation of said one stage until the system is reset.

References Cited by the Examiner
UNITED STATES PATENTS

| | | | |
|---|---|---|---|
| 1,465,394 | 8/1923 | Houskeeper | 328—9 |
| 2,587,290 | 2/1952 | Dailey et al. | 328—9 |
| 2,940,010 | 6/1960 | Kenny | 315—105 X |
| 3,072,822 | 1/1963 | Holmes | 315—107 |

JOHN W. HUCKERT, *Primary Examiner.*

A. M. LESNIAK, *Assistant Examiner.*